STORE ORDERING SYSTEM AND APPARATUS

Original Filed April 19, 1957 8 Sheets-Sheet 1

INVENTORS
Robert Goldwater
Frank B. Calhoun
BY Flehr and Swain
Attorneys

STORE ORDERING SYSTEM AND APPARATUS

Original Filed April 19, 1957 8 Sheets-Sheet 2

INVENTORS
Robert Goldwater
Frank B. Calhoun
BY
Flehr and Swain
Attorneys

STORE ORDERING SYSTEM AND APPARATUS

Original Filed April 19, 1957 8 Sheets-Sheet 3

INVENTORS
Robert Goldwater
Frank B. Calhoun
BY
Flehr and Swain
Attorneys

STORE ORDERING SYSTEM AND APPARATUS

Original Filed April 19, 1957 8 Sheets-Sheet 4

INVENTORS
Robert Goldwater
Frank B. Calhoun
BY
Fleh & Swain
Attorneys

STORE ORDERING SYSTEM AND APPARATUS

Original Filed April 19, 1957 8 Sheets-Sheet 5

INVENTORS
Robert Goldwater
Frank B. Calhoun
BY
Flehr & Swain
Attorneys

STORE ORDERING SYSTEM AND APPARATUS

Original Filed April 19, 1957 8 Sheets-Sheet 6

INVENTORS
Robert Goldwater
Frank B. Calhoun

BY

Flehr and Swain
Attorneys

STORE ORDERING SYSTEM AND APPARATUS

Original Filed April 19, 1957 8 Sheets-Sheet 7

INVENTORS
Robert Goldwater
Frank B. Calhoun
BY
Flehr and Swain
Attorneys

STORE ORDERING SYSTEM AND APPARATUS

Original Filed April 19, 1957 8 Sheets-Sheet 8

INVENTORS
Robert Goldwater
Frank B. Calhoun
BY
Fleht and Swain
Attorneys

United States Patent Office

Re. 25,600
Reissued June 16, 1964

25,600

STORE ORDERING SYSTEM AND APPARATUS

Robert Goldwater, Oakland, and Frank B. Calhoun, Fremont, Calif., assignors to Safeway Stores, Inc., Oakland, Calif., a corporation of Maryland Original No. 2,980,758, dated Apr. 18, 1961, Ser. No. 653,898, Apr. 19, 1957. Application for reissue Mar. 1, 1963, Ser. No. 262,280

15 Claims. (Cl. 178—4)

Matter enclosed in heavy brackets [ ] appears in the original patent but forms no part of this reissue specification; matter printed in italics indicates the additions made by reissue.

This invention relates generally to a store ordering system and apparatus and in particular to store ordering machines for use in such systems.

In far-flung store chains such as grocery store chains, it is often desirable to provide means whereby the stores can rapidly order merchandise from widely separated warehouses or areas. Where perishable foods such as fruit and vegetables are concerned, it is also desirable to expedite movement of the perishables to the stores as rapidly as possible. At the same time the orders are being placed by the stores, it is desirable to provide billing information to facilitate the keeping of accounting records. Systems and apparatus provided for such purposes must not be unduly expensive. They also must be easy to operate to facilitate rapid ordering with the least possible opportunuity for operator error. Insofar as we are aware, no system or apparatus is available which fulfills these requirements.

In general, it is an object of the present invention to provide a store ordering system and apparatus which facilitates rapid ordering of merchandise with little opportunity for error.

Another object of the invention is to provide a system and apparatus of the above character which at the same time provides billing information Another object of the invention is to provide a system and apparatus of the above character which operates in conjunction with a conventional five channel paper tape.

Another object of the invention is to provide a novel store ordering machine for use in a store ordering system of the above character.

Another object of the invention is to provide a store ordering machine of the above character which automatically causes the heading for the order to be punched on a five channel paper tape when a heading button is depressed and released.

Another object of the invention is to provide a store ordering machine of the above character wherein the heading utilized includes the month of the year, day of the month, and number of the store placing the order and the number of the warehouse from which the commodities are being ordered.

Another object of the invention is to provide a store ordering machine of the above character in which the commodities desired can be easily selected.

Another object of the invention is to provide a store ordering machine of the above character which automatically, upon depression and release of a commodity button, causes the code number of the selected commodity to be punched on the tape together with the page number of the order guide page from which the commodity is selected.

Another object of the invention is to provide a store ordering machine of the above character in which the quantities desired of the commodity selected can be dialed to automatically cause the desired quantity to be punched on the tape.

Another object of the invention is to provide a store ordering machine of the above character in which carriage returns, line feeds and figures are caused to be automatically punched on the tape upon depression and release of push buttons.

Another object of the invention is to provide a store ordering machine of the above character which gives a warning signal when the bottom of the order page has been reached.

Additional objects and features of the invention will appear from the following description in which the preferred embodiment has been set forth in detail in conjunction with the accompanying drawing.

Referring to the drawing.

Figure 1:
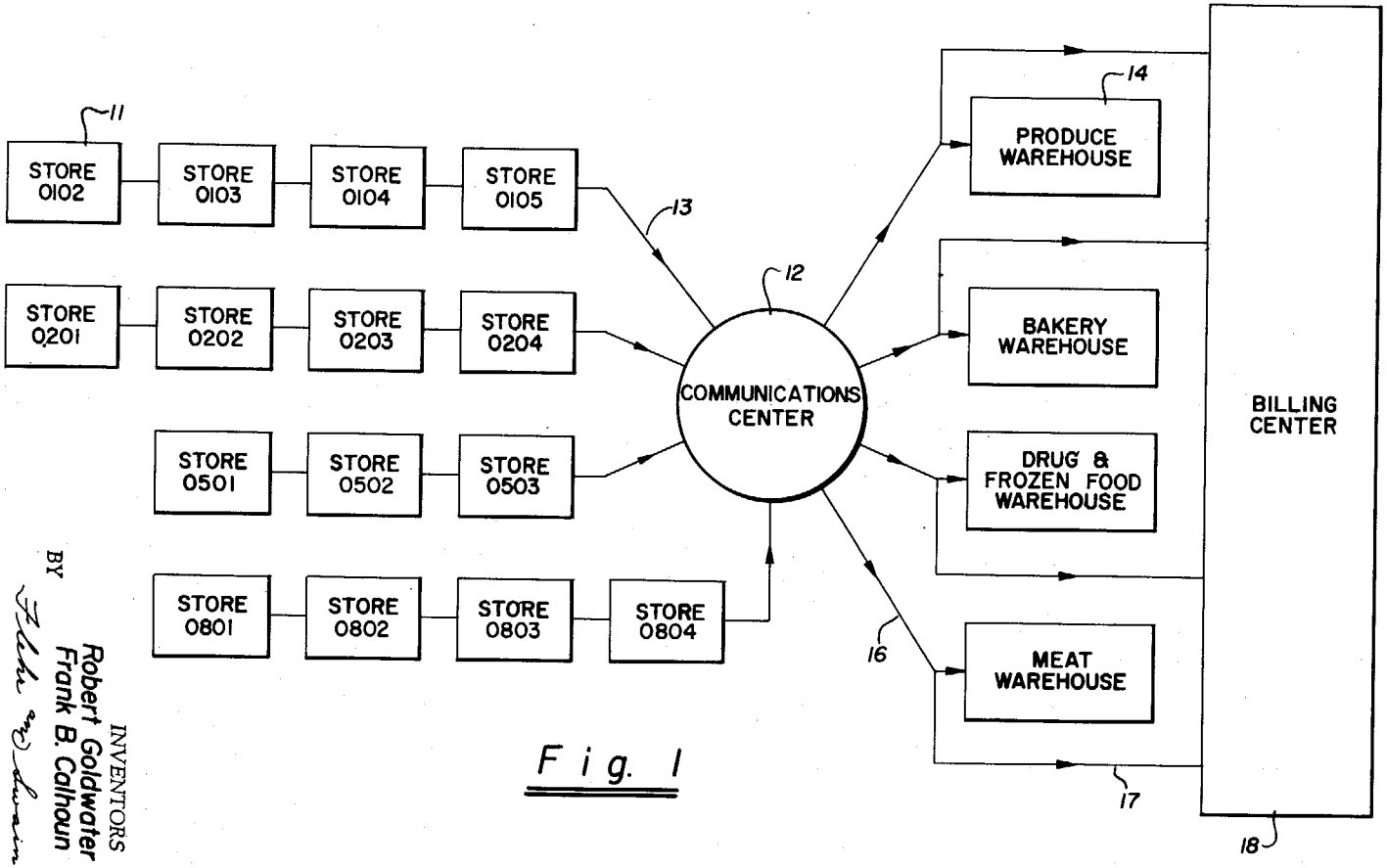
FIGURE 1 is a block diagram showing a typical store ordering system.
Figures 2A, 2B, 2C, 2D:
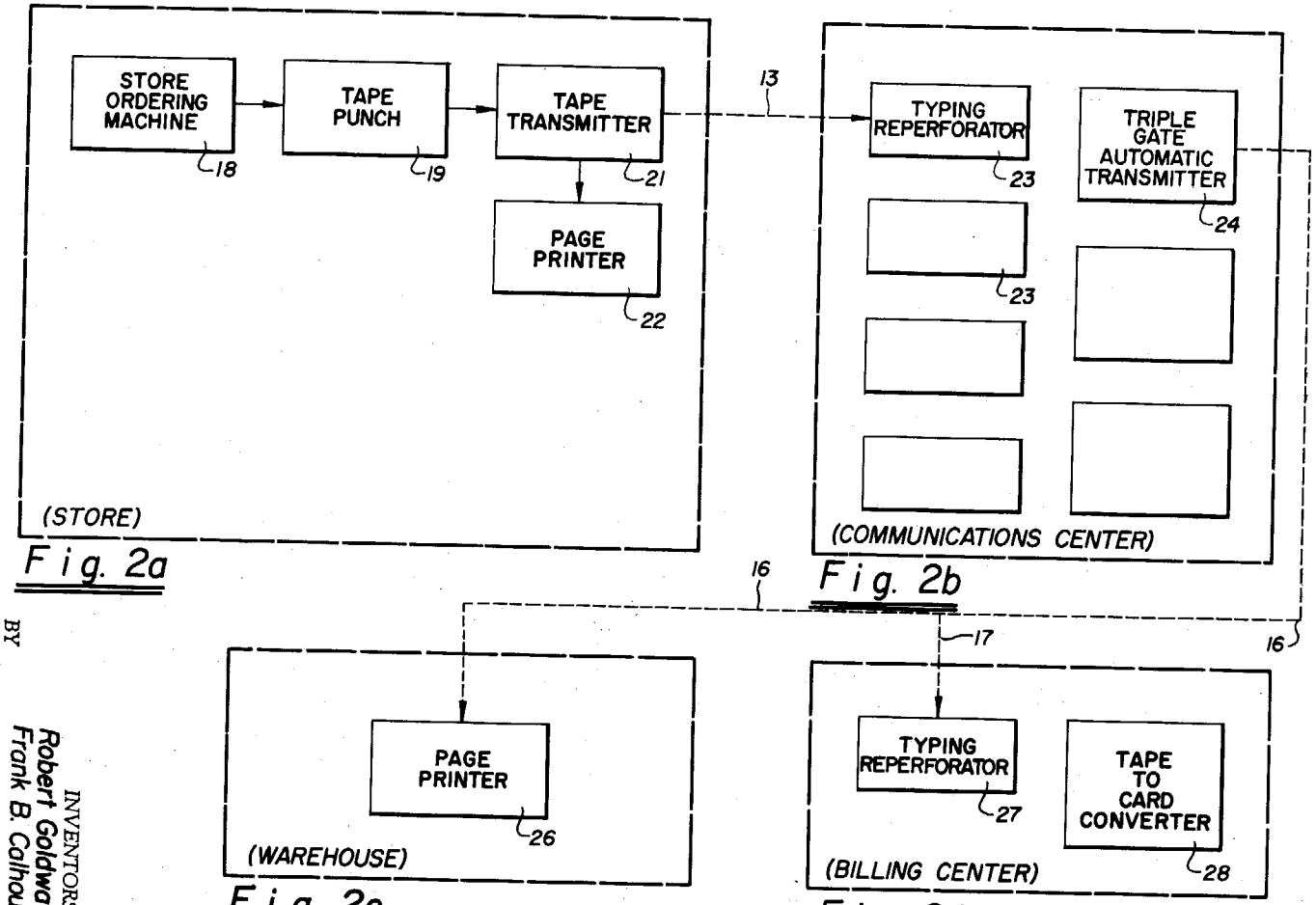
FIGURE 2A shows in block diagram form the equipment located in a typical store.
FIGURES 2B, 2C and 2D show in block diagram form the apparatus utilized in conventional communication centers, warehouses and billing centers respectively.

The store ordering system shown in FIGURE 1 of the drawing consists of a plurality of stores 11 connected to a communications center 12 by suitable electric circuit means such as the lines 13. As shown, one or more stores can be connected to the same line because each store does not need continuous use of a line for reasons hereinafter apparent. The communication center 12 is connected to a plurality of warehouses 14 by suitable electrical circuit means such as lines 16. The lines 16 leading to the warehouses are connected by lines 17 to a billing center 18.

Suitable apparatus is provided in each of the stores, in the communication center, in the billing center and in the warehouses, as shown in FIGURES 2A, 2B, 2C and 2D. Thus, the apparatus in each of the stores can consist of a store ordering machine 18 which will hereinafter be described in detail, a tape punch 19, a tape transmitter 21 and a page printer 22.

The tape punch can be of any suitable type for producing five channel paper tape such as the model No. 2 motorized tape punch manufactured by Commercial Controls Corp. of Rochester, New York. The tape transmitter can also be of any suitable type adapted to receive five channel paper tape such as the model No. 14 manufactured by the Teletype Corp. The page printer may be of any suitable type which is adapted to produce a printed copy of the information sent through the tape transmitter such as the model No. 15 manufactured by Teletype Corp.

As is well known to those skilled in the art, the tape transmitter produces a series of pulses in the form of marks and spaces which can be transmitted over electrical circuit means as in this case the lines 13 to the communication center 12. Each of the lines coming into the communication center are connected to a typing reperforator 23 and also may be of any suitable type such as one manufactured by Teletype Corp. The typing reperforator as is well known to those skilled in the art produces a five channel paper tape from the information received on the line 13.

As soon as the five channel tapes are produced, the tapes are separated into strips for the various warehouses. The tapes are then fed into the automatic transmitters 24 and the information on the tape is sent in the form of marks and spaces over the lines 16 to the respective warehouses. The pulses are received by a page printer 26 such as the model No. 15 manufactured by the Teletype Corp. which is located at the warehouse. A suitable printed record is produced by the page printer such as a three part form hereinafter described.

The same information which is received by the warehouses is also sent to the billing center and is received on a typing reperforator 27 of the same type as utilized in the communication center which produces an interpreted five channel tape from the information received. The interpreted tapes are then run through a tape-to-card converter 28 to create cards for each store order. The tape-to-card converter can be of any suitable type well known to those skilled in the art such as one which utilizes IBM cards. Operation of the entire system will be described in detail after we have had an opportunity to describe our store ordering machine.

Figure 3:
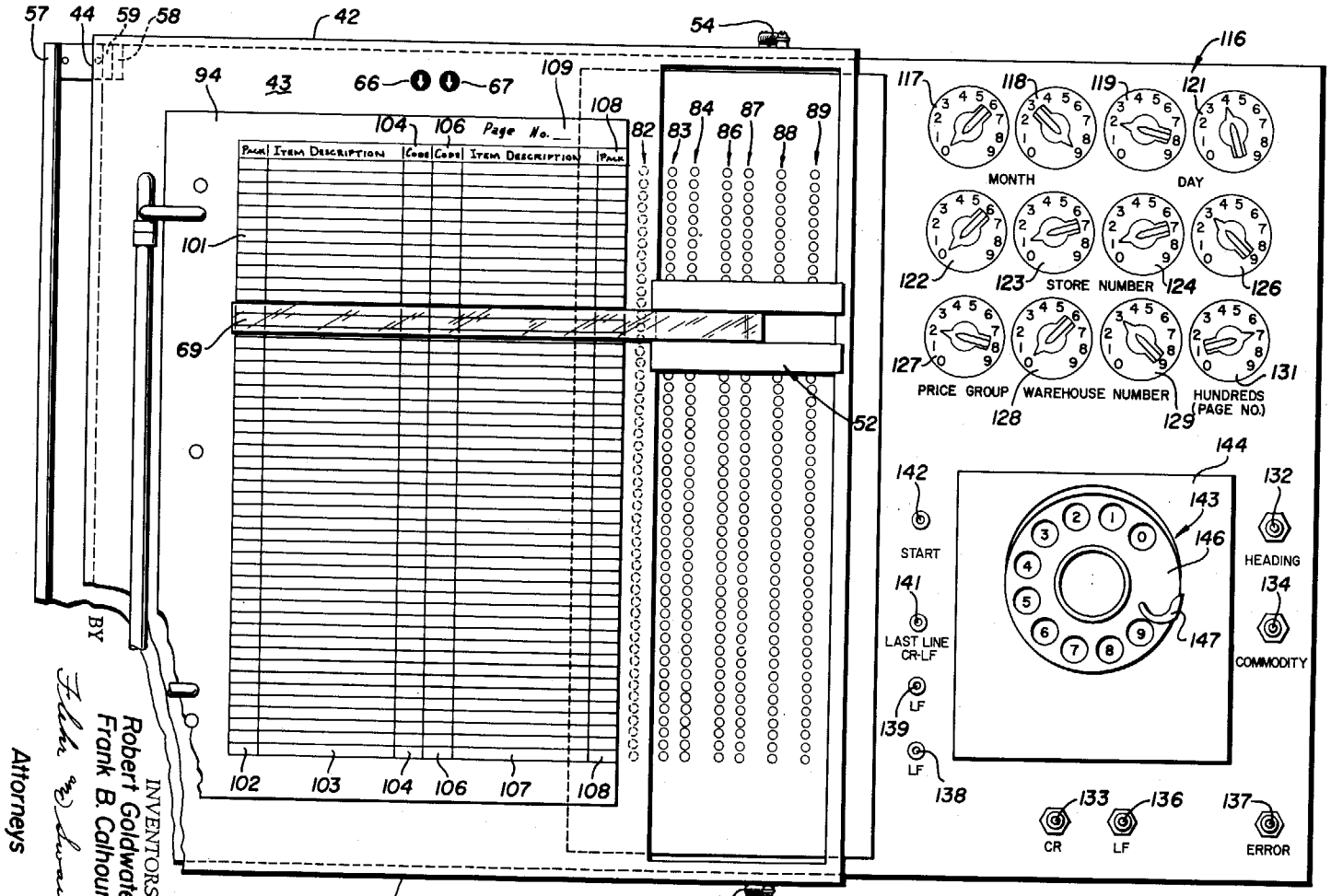
FIGURE 3 is a plan view of our store ordering machine.
Figure 4:
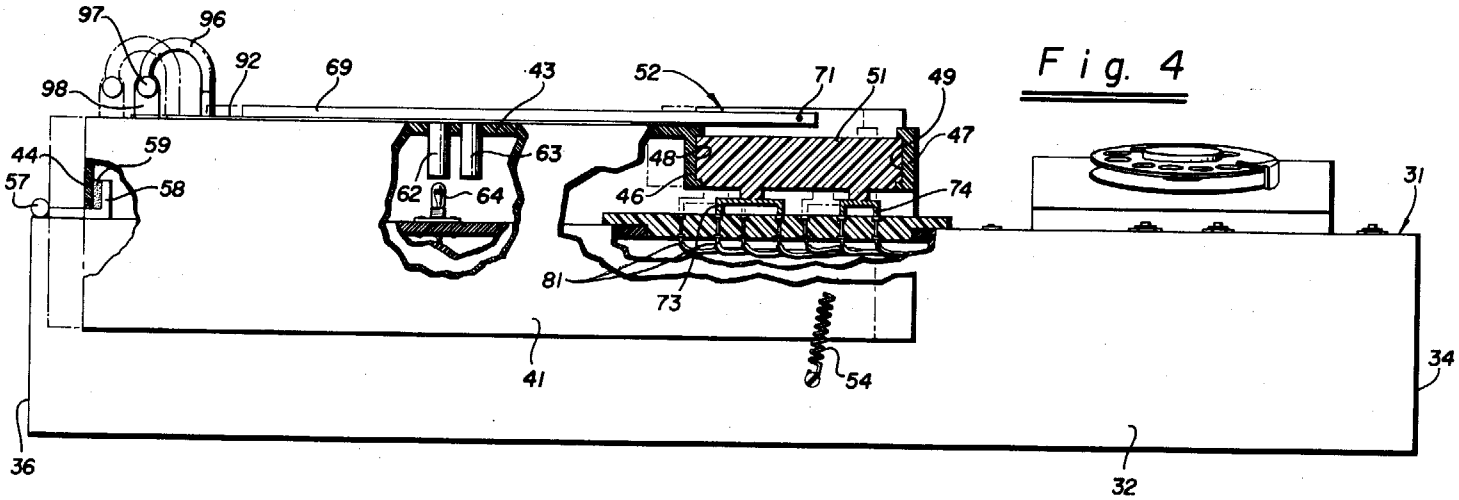
FIGURE 4 is a front elevational view with certain portions broken away, of our store ordering machine.
Figure 5:
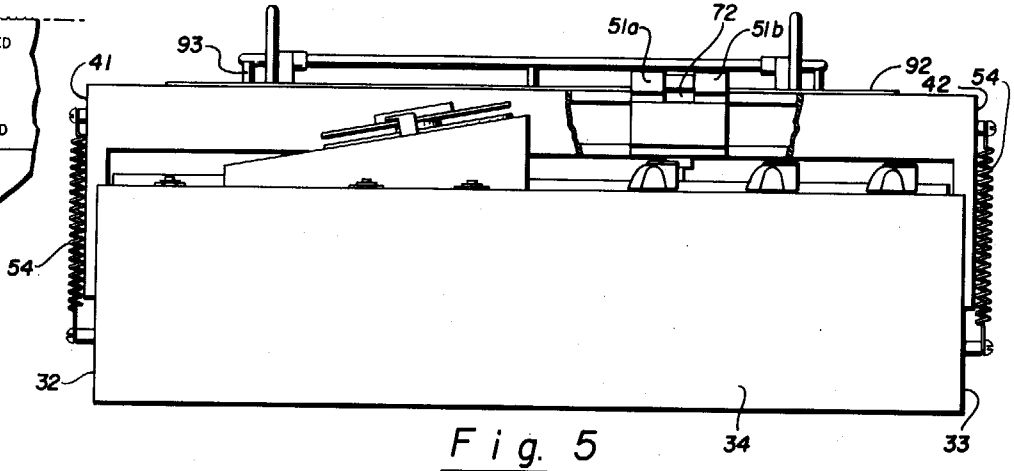
FIGURE 5 is a side elevational view of our store ordering machine.

Our store ordering machine is shown in detail in FIGURES 3, 4 and 5 of the drawing and consists of a rectangular box-like framework 31 having sidewalls 32 and 33, end walls 34 and 36 and a top wall 37.

A sliding table 39 is slidably mounted on the left hand portion of the framework 31 as viewed in FIGURE 3. The sliding table consists of side panels 41 and 42 which are held in a fixed relationship by top wall 43 and an end wall 44. The side panels 41 and 42 extend below the top surface of the framework 31. A pair of cross members 46 and 47 are mounted transversely of the sliding table 39 between the side panels 41 and 42 and are provided with grooves 48 and 49 which slidably receive a mounting block 51 which forms a part of a sliding arm assembly 52. The sliding table may be formed of any suitable material such as plastic. The sliding table 39 is held in a general position by suitable means such as springs 54 mounted on opposite sides of the sliding table which have their upper ends connected to the sliding table and their lower ends connected to the framework 31 as shown.

The sliding table is adapted to be moved between two positions as shown in FIGURE 4, the left hand position as viewed in FIGURE 4 being determined by the stop 57 and the right hand position being determined by the L-shaped member 58 upon which has been mounted a foam rubber cushioning member 59. A pair of transparent members 62 and 63 of suitable material such as "Lucite" are mounted in the top wall 43 of the sliding table and are adapted to transmit light from the lamp 64 mounted on the top wall of the framework 31 to the arrows 66 and 67 provided on the top wall of the sliding table 39.

The sliding assembly arm 52 includes an elongate member or arm 69 which has one end pivotally connected to the mounting block 51 by pin 71 fastened to parallel vertical spaced portions 51a and 52b of the block 51. The portions 51a and 51b form a groove 72 which receives the fixed end of the arm 69. It is readily apparent that the free end of the arm 69 can be lifted from on top of the top wall 43 and moved to an out-of-the-way position for a purpose hereinafter described.

Movable contact means consisting of a pair of contact arms 73 and 74 is mounted on the lower surface of the mounting block 51 and is adapted to be shifted transversely of the framework 31 by movement of the block 51 in the grooves 48 and 49 and longitudinally of the framework 31 by movement of the sliding table 39. As shown in the drawing, the contact arms 73 and 74 are each in the configuration of a U-shaped member and are formed of a suitable conducting material such as copper. The contact arms 73 and 74 are adapted to engage fixed contact means consisting of rows of readout contacts 76 which may be mounted upon the rectangular framework 31 in any suitable manner. For example, as shown, the contacts can be mounted in a rectangular plate 77 of suitable insulating material such as plastic. The plate 77 is mounted over a rectangular opening within the top wall 37 of the framework 31. Leads 81 electrically interconnect the contacts and connect them to electrical apparatus as shown in the circuit diagram in FIGURES 6A, 6B, 6C and 6D as hereinafter described.

As shown in the drawing, seven separate rows, rows 82, 83, 84, 86, 87, 88 and 89, of contacts are provided each row containing fifty contacts. The distances between rows 87 and 88 and 88 and 89 are equal so that they can be engaged by the contact arm 74 in either of two positions as shown in FIGURE 4. The distances between rows 82 and 84 and 83 and 86 are also equal so that they can also be engaged by the contact arm 73 in either of two positions as shown in FIGURE 4. The function of each of these rows of contacts is hereinafter described.

Suitable page retaining means is mounted on the sliding table 39 and consists of plate 92 which is fixed to the left hand side of the sliding table 39 and which is provided with three upstanding pins 93 which are spaced to receive one or more order guide pages 94 punched on their left hand margins in the conventional manner. Suitable means is also provided for retaining the pages 94 on the pins 93 and consists of a pair of substantially U-shaped keeper members 96 which are fixed to a rod 97 pivotally carried by mounting posts 98 fixed to the plate 92. Movement of the rod 97 relative to the posts 98 is frictionally restrained so that the keeper members 96 will remain in any predetermined position. Thus, after the order guide pages have been inserted on the pins 93, the keeper members 96 may be moved into engagement with the pages to retain them on the pins 93.

The order guide pages may be set up in any desired manner. However, as shown in FIGURE 3 of the drawing the order guide pages are preferably provided with equally spaced horizontal lines 101 of the same number as each row of contacts and which have the same vertical spacing as do the contacts 76. Vertical columns 102, 103, 104, 106, 107 and 108 are provided on each sheet.

The commodities normally ordered by the stores are placed on order guide pages, the commodities on the different pages being separated according to their conventional classification. For example, if the order guide page shown in the drawing is one which contains fruit juices, the various columns are labeled in the following manner. Column 102 is used to designate the conventional pack of the item involved, e.g. whether 12 cans or 24 cans per case. Column 103 is used for the item description and contains the common name of the item. It may also contain the trademark the item carries and the size of the can. Column 104 is utilized for the code numbers of the items. The code numbers start with 00 in column 104 and end with 49. Each item is assigned a numerical code number such as 12 and is placed on the proper line on the order guide page.

Column 106 is utilized for the code numbers of the items appearing in the description given in the column 107 and column 108 is utilized for the common pack of the item described in column 107. The code numbers in column 106 run from 50 to 99.

Thus, on each order guide page two separate rows or lists of commodities appear. The upper edge of the arm 69 is adapted to be moved into position immediately below any one of the items listed on the order guide page. The sliding table 39, as hereinbefore described, is adapted to be moved to either of two positions as hereinbefore described. The position of the table is denoted by the arrows 66 and 67. When the arrow 66 is lit, the sliding table 39 is in its extreme right position as viewed in FIGURE 3 and the apparatus is in the position in which the commodities coded in column 104 may be ordered. When the sliding table is in an extreme left position, the arrow 67 is lit and the apparatus is in a position in which the items coded in column 106 may be ordered.

Each of the order guide pages is provided with a page number 109 for a purpose hereinafter described.

The right hand side of the top wall 37 of the rectangular framework 31 carries the control panel portion of our store ordering machine. The control panel portion 116 consists of twelve selector switches 117, 118, 119, 121, 122, 123, 124, 126, 127, 128, 129 and 131, eleven of which are used for setting up the heading of the order. The selector switches are of any suitable type such as No. 31112J manufactured by Mallory. As shown, each selector switch is provided with ten contacts numbered from 0 to 9. Selector switches 117 and 118 are used for setting up the month of the year and selector switches 119 and 121 are used for setting up the day of the month. Selector switches 122, 123, 124 and 126 are used for setting up the number of the store placing the order, selector switch 127 is used for setting up the price group, switches 128 and 129 are used for setting up the warehouse number, and switch 131 is used for setting up the page number of the order guide page.

The control panel is also provided with "heading," "carriage return (CR)," and "commodity," push buttons 132, 133 and 134 respectively. These push buttons can be of any suitable type such as No. 203 manufactured by Switchcraft. The control panel is also provided with "line feed (LF)" and "error," push buttons 136 and 137 respectively. Switch 136 can be of any suitable type such as catalog No. 1006 manufactured by Switchcraft. The same is true for push button 137 which can be a catalog No. 103 manufactured by Switchcraft.

Lamps 138, 139, 141 and 142 designated as shown, as mounted on the control panel and can be of any suitable type such as neon glow lamps manufactured by General Electric and designated by type No. NE–2. A telephone dialing device 143 of suitable type such as manufactured by Western Electric is mounted on a raised inclined platform 44 provided on the framework 31. The telephone dialing device differs slightly from the ones commonly manufactured in that the dial reads from 0, 1, 2, 3 to 9 rather than from 1 to 9 to 0 for the sole reason that many more 0's are dialed than 9's as hereinafter described. The telephone dialing device includes the dial 146 and the stop 147.

Figure 6A:
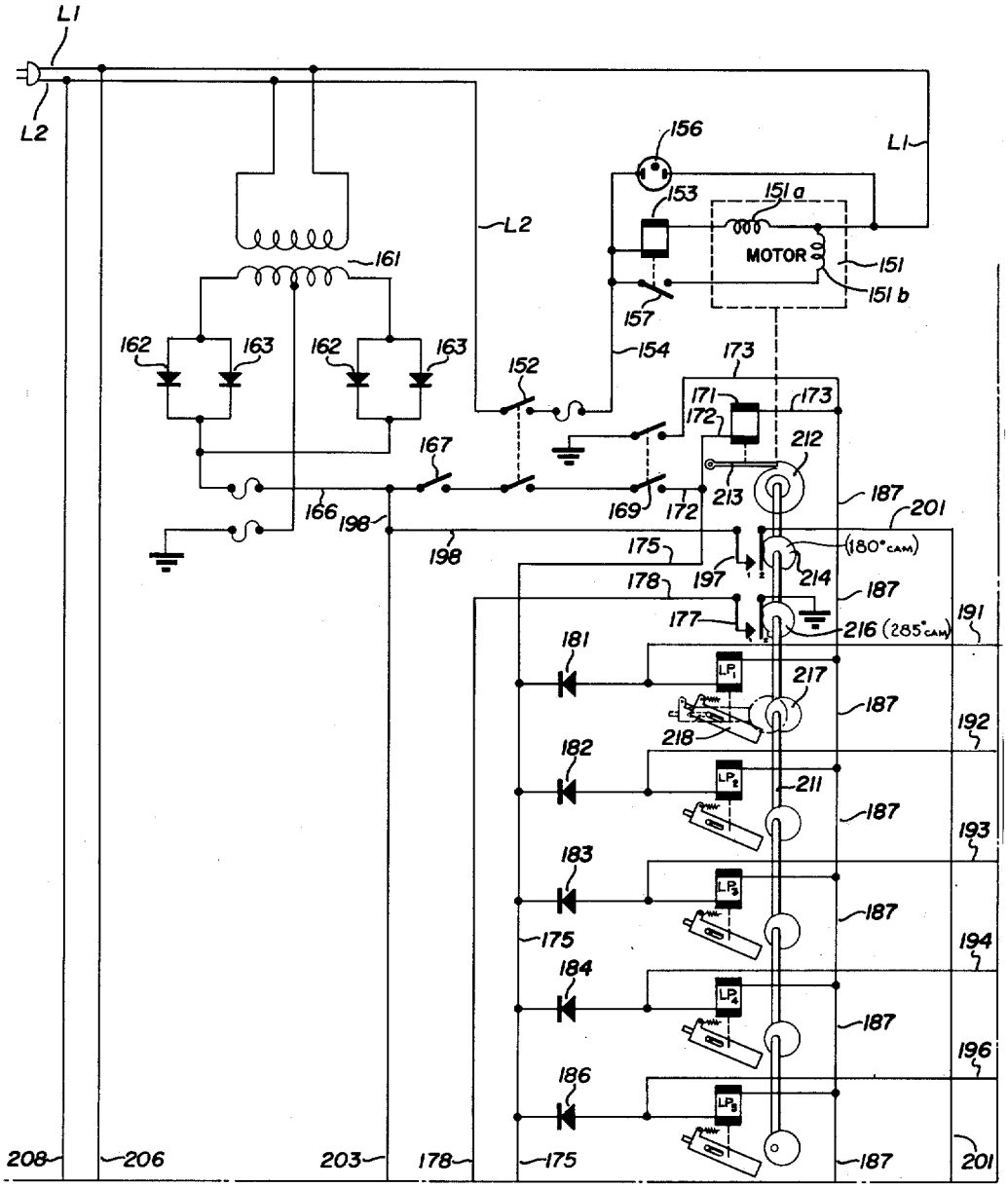
FIGURES 6A, 6B, 6C and 6D show a circuit diagram of our store ordering machine with certain parts schematically illustrated.

The remainder of the electrical apparatus comprising the store ordering machine is mounted within the rectangular framework 31 upon the bottom wall (not shown) of the same. This additional apparatus will be described in connection with the circuit diagram which is shown in FIGURES 6A, 6B, 6C and 6D. As shown in FIGURE 6A, the apparatus is connected to a conventional power supply such as 110 volt 60 cycle A.C. through lines L1 and L2. Line L1 is connected to one side of winding 151a of a motor 151 and line L2 is connected to one side of one pole of a double pole single throw power switch 152. The other side of the same pole of the switch 152 is connected to the other side of the winding 151a of the motor 151 through a relay coil 153 by a conductor 154. A lamp 156 is connected between conductor 154 and line L1 and serves to indicate when the power switch 152 is closed and the motor 151 is operating. Contacts 157 are moved to a closed position by energization of the relay coil 153 and are connected between conductor 154 and winding 151b of the motor 151.

The primary of a transformer 161 is connected between the lines L1 and L2. Each side of the secondary of the transformer 161 is connected to parallel rectifiers 162 and 163. The outputs of the rectifiers are connected together to provide a suitable positive voltage such as 48 volts D.C. which is applied to a conductor 166. The center tap of the secondary of the transformer 161 is connected to ground as shown. Conductor 166 is connected to one side of a switch 167 which is normally closed when the paper tape is in a proper position in the tape punch 19.

The other side of the switch 167 is connected to one side of one pole of the switch 152 and the other side of the same pole is connected to one side of one pole of switch 169 and the other side of the same pole of switch 169 is connected to a solenoid 171 by conductor 172. The other side of the solenoid 171 is connected to one side of the other pole of the switch 169 by a conductor 173 and the other side of the same pole is connected to ground as shown.

Conductor 172 which carries the positive voltage is connected to one side of relay coil 174 (FIGURE 6C) by conductor 175. The other side of the relay coil 174 is connected to a voltage dropping resistor 176. The other side of the voltage dropping resistor 176 is connected to the stationary contact 1 of contacts 177 by conductor 178. The movable contact 2 of contacts 177 is connected to ground as shown.

Rectifiers 181, 182, 183, 184 and 186 are all connected to conductor 175 in parallel and are connected to punch magnets LP1, LP2, LP3, LP4 and LP5 respectively. The other sides of the magnets are connected in parallel to a conductor 187 which is connected to conductor 173. The punch magnets LP1, LP2, LP2, LP4 and LP5 are also connected to conductors 191, 192, 193, 194 and 196 respectively.

Conductor 166 is connected to stationary contact 1 of contacts 197 by conductor 198 and movable contact 2 of contacts 197 is connected to the stationary contact 4 of step switch HS by conductor 201. Conductor 198 is connected to movable contact 202 of the dialing device 143 by conductor 203.

Line L1 is connected to one side of the relay coil for relay R1 by conductor 206 and L2 is connected to the wiping arm of step switch LS by conductor 208.

As is schematically illustrated in FIGURE 6A, the motor 151 serves to drive a shaft 211 on which is mounted a clutch member 212 which is adapted to be released by a clutch lever 213. Clutch lever 213 is lifted or released by energization of the solenoid 171. A 180° cam 214 and a 285° cam 216 are also mounted on the shaft 211 and are adapted to operate contacts 197 and 177, respectively. A plurality of punch operating cams 217 are also mounted on the shaft 211 and are adapted to operate punches 218 when the punches are moved into position by their associated magnets LP1, LP2, LP3, LP4, and LP5.

It is to be understood that the punches, the punch operating cams and the motor 151 do not actually form a part of our store ordering machine but are actually part of the tape punch 19 which is located in each of the stores and connected to the store ordering machine.

It will be noted that the stepping switch LS is provided with 32 terminals in addition to the home terminal on which the wiping arm normally rests. The home terminal is connected to one side of a neon lamp 142 by conductor 222. The other side of the neon lamp 142 is connected to one side of a voltage dropping resistor 223 by conductor 224 and the other side of resistor 223 is connected to conductor 206 by conductor 226. Conductor 226 is connected to one side of a voltage dropping resistor 227 by conductor 228 and the other side of resistor 227 is connected to a neon lamp 141. The other side of the neon lamp 141 is connected to terminal 28 of switch LS by conductor 229. A belt 231 is connected in parallel with the resistor 227 and the lamp 141 between conductors 228 and 229.

Terminal 29 of switch LS is connected to one side of neon lamp 138 and the other side of the lamp 138 is connected to conductor 224. Terminal 30 of switch LS is connected to one side of lamp 139 and the other side of lamp 139 is connected to conductor 224. Terminals 31 and 32 of switch LS are interconnected and are connected to one side of relay R1 by conductor 232.

The stationary contact 1 for relay R1 is connected to conductor 203 and the movable contact 2 of relay R1 is connected to movable contact 2 of stepping switch LS by conductor 236. The stationary contact 1 of switch LS is connected to the stationary contact 1 of the interrupting contacts for switch LS by conductor 238 and the movable contact 2 of the interrupting contacts is connected to one side of stepping coil 239. The other side of the stepping coil 239 is connected to ground as shown. The movable contact 2 of the interrupting contacts is also connected to a spark arresting network consisting of a resistor 241 and a capacitor 242 connected in series to conductor 203.

Movable contact 4 of switch LS is connected to conductor 246 and the stationary contact 3 of switch LS is connected to conductor 247. Moveable contact 2 of the interrupting contacts for switch LS is also connected to a conductor 248. A conductor 249 is connected to conductor 203 and a conductor 251 is connected to the stationary contact 2 of the pulsing contacts 252 of the telephone dial device 143. The movable contact 1 of pulsing contacts 252 is connected to a movable contact 253 which is adapted to be engaged by an arcuate contact member 254 as hereinafter described. The member 254 normally engages a fixed contact 256 which is connected to a conductor 257. A spark arresting network consisting of a resistor 258 and a condenser 259 is connected between conductor 203 and conductor 251.

The conductor 187 is connected to the movable contact 2 of relay R2 and the stationary contact 1 of relay R2 is connected to the stationary contact 3 of relay 174. The movable contact 4 of relay R2 is connected to ground as shown. One side of the winding of relay R2 is connected to one side of a voltage dropping resistor 266 and the other side of the resistor 266 is connected to conductor 178 by conductor 267. The other side of the winding of relay 262 is connected to one side of a time delay condenser 268 by conductor 269 and the other side of the condenser 268 is connected to conductor 267. A time delay condenser 270 is connected between conductor 175 and one side of the resistor 176. The movable contacts 2 and 4 of relay AR are connected to ground and the stationary contact 1 is connected to a conductor 273. Stationary contact 3 of relay AR is connected to stationary contact 1 of relay R2. The conductor 267 is connected to a conductor 274. Conductor 269 is connected to a conductor 276 and conductor 175 is connected to conductor 277.

Figure 6B:
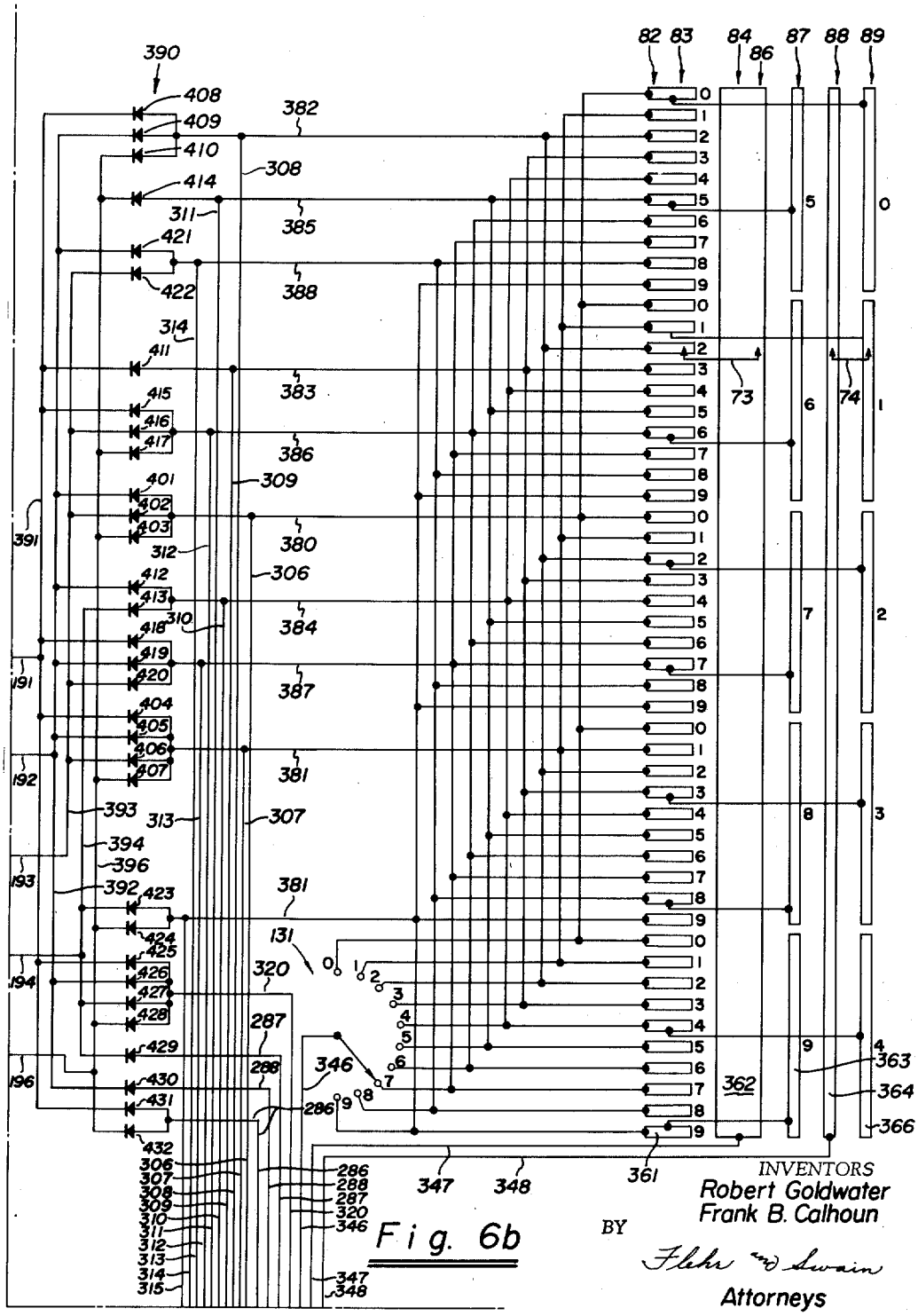
Figure 6C:
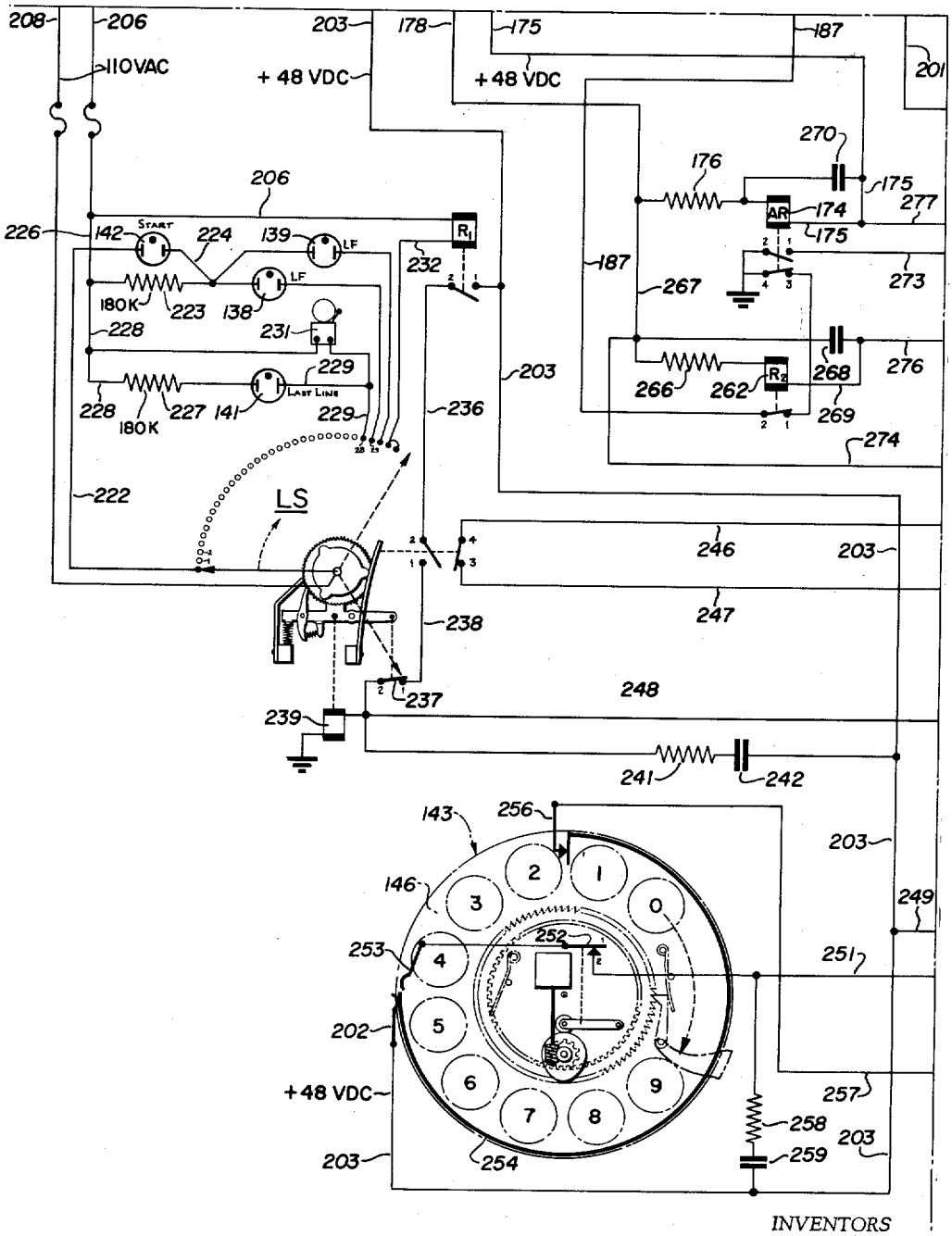
Figure 6D:
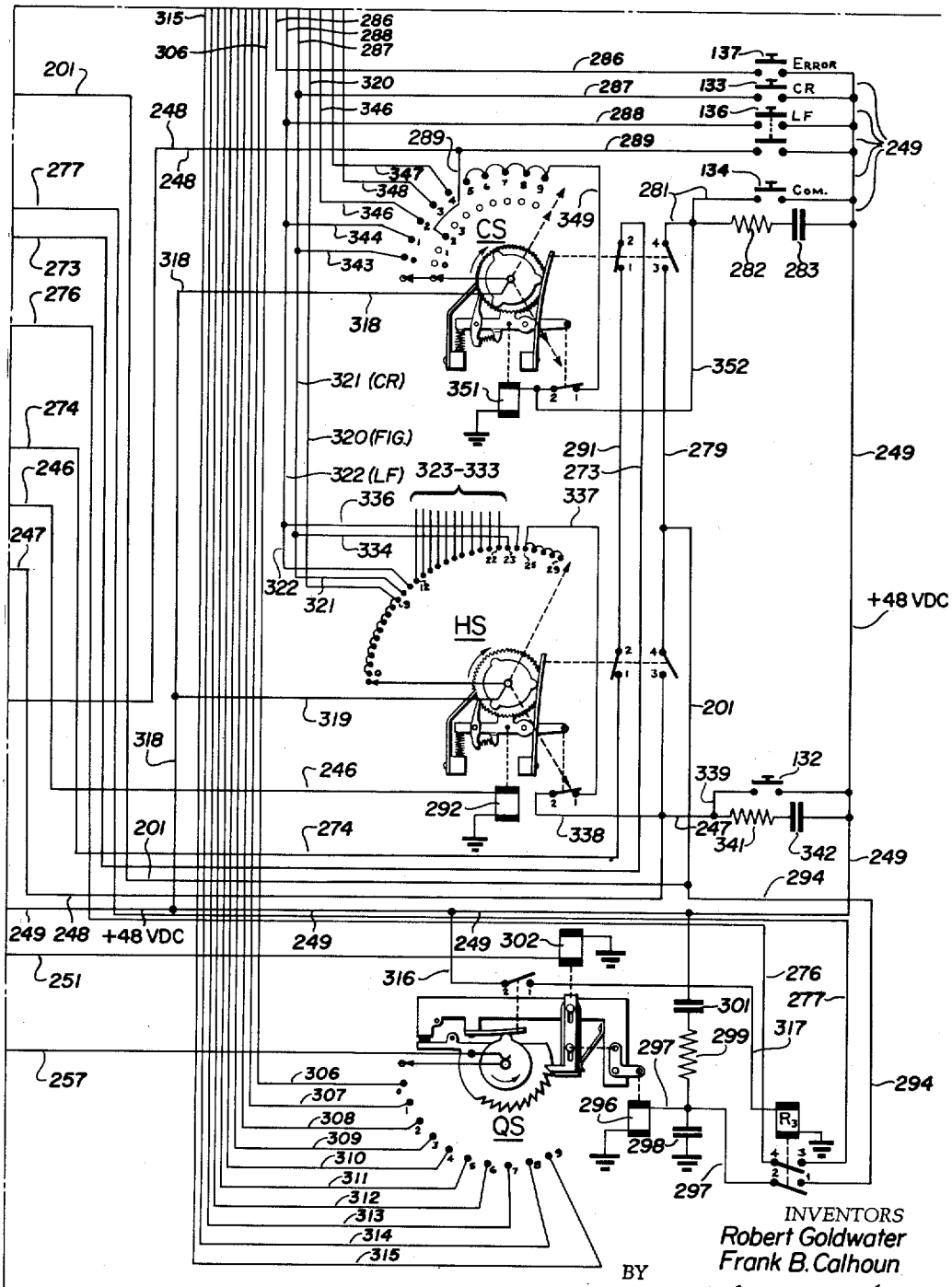

Turning now to FIGURE 6D of the circuit diagram, it will be noted that conductor 201 is connected to movable contact 4 of contacts 3 and 4 of step switch HS. Conductor 201 is also connected to stationary contact 3 of contacts 3 and 4 of switch CS by conductor 279. Movable contact 4 of contacts 3 and 4 for switch CS is connected to one side of the commodity push button 134 by conductor 281. The other side of the commodity push button 134 is connected to conductor 249. A spark arresting network consisting of a resistor 282 and a capacitor 283 are connected in series between conductors 249 and 281. Conductor 249 is connected to one side of each of the push buttons 137 and 133 and both poles of the push button 136. The other sides of push buttons 137, 133 and both poles of push buttons 136 are connected to conductors 286 and 287, 288 and 289 respectively. Conductor 289 is connected to terminal 2 of bank 2 of switch CS. Conductor 289 is also connected to conductor 248.

Conductor 273 is connected to movable contact 2 of contacts 1 and 2 of switch CS and stationary contact 1 of contacts 1 and 2 of switch CS is connected to movable contact 2 of contacts 1 and 2 of switch HS. Stationary contact 1 of contacts 1 and 2 of switch HS is connected to conductor 274.

Conductor 246 is connected to one side of the stepping coil 292 for switch HS and the other side of the stepping coil 292 is connected to ground. Conductor 247 is connected to stationary contact 3 of contacts 3 and 4 of switch HS. Conductor 201 is connected to stationary contact 1 of contacts 1 and 2 of relay R3 by conductor 294. Movable contact 2 of contacts 1 and 2 of relay R3 is connected to one side of the step coil 296 for minor switch QS by conductor 297. Conductor 297 is connected to ground through a capacitor 298. Conductor 297 is also connected to conductor 249 through a spark arresting network consisting of a serially connected resistor 299 and a capacitor 301.

Conductor 251 is connected to one side of a stepping coil 302 and the other side of the stepping coil 302 is connected to ground. Conductor 257 is connected to the wiping contact for switch QS. Terminals 0 to 9 of switch QS are connected to conductors 306 to 315, respectively.

Conductor 249 is connected to movable contact 2 of interrupting contacts 1 and 2 of switch QS by conductor 316 and stationary contact 1 of interrupting contacts 1 and 2 is connected to one side of the relay coil R3 by conductor 317. The other side of the relay coil R3 is connected to ground. Conductor 249 is also connected to the wiping contact of switch CS by conductor 318. Conductor 318 is connected to the wiping contact of switch HS by conductor 319. Conductors 276 and 277 are connected to contacts 4 and 3, respectively, of relay R3.

Terminals 0 to 9 of switch HS are connected to conductor 320. Terminals 10 and 11 of the same switch are connected to conductors 321 and 322, respectively. Conductor 321 is connected to conductor 287 and conductor 322 is connected to conductor 288. Terminals 12 through 22 of switch HS are connected to conductors 322 to 333 which are connected to the wipers of selector switches 117, 118, 119, 121, 122, 123, 124, 126, 127, 128 and 129, respectively as hereinafter described.

Terminal 23 of switch HS is connected to conductor 321 by conductor 334 and terminal 24 is connected to conductor 322 by conductor 336. Terminals 25 to 29 are interconnected and are connected to stationary contact 1 of interrupting contacts 1 and 2 of switch HS by conductor 337. Movable contact 2 of the interrupting contacts of switch HS is connected to conductor 247 by conductor 338. Conductor 247 is connected to one side of the heading push button 132 by conductor 339 and the other side of the heading push button 132 is connected to conductor 249. A spark arresting network consisting of a serially connected resistor 341 and capacitor 342 are connected between conductors 339 and 249.

Terminal 0 of bank 1 of switch CS is connected to conductor 321 by conductor 343. Terminal 1 of the same bank is connected to conductor 322 by conductor 344. Terminals 2, 3 and 4 of the same bank are connected to conductors 346, 348 and 347, respectively. Terminals 5, 6, 7, 8 and 9 of bank 1 of switch CS are interconnected and are connected to stationary contact 1 of interrupting contacts 1 and 2 of switch CS by conductor 349. Movable contact 2 of interrupting contacts 1 and 2 is connected to one side of the step coil 351 for the relay CS. The other side of the step coil is connected to ground. Movable contact 2 of the interrupting contacts 1 and 2 of switch CS is also connected to conductor 281 by conductor 352.

Now turning to the portion of the circuit diagram shown in FIGURE 6B, it will be noted that the rows of contacts 76 designated by the numbers 82, 83, 84, 86, 87, 88 and 89 shown in FIGURE 3 are represented by a plurality of bars. As hereinbefore described, each of the rows contains 50 contacts spaced equally in a vertical direction. Rows 82 and 83 are designated as the units digits rows and are numbered from 0 to 9 repeated five times as shown in FIGURE 6B. The same numbered contacts of each of the rows 82 and 83 are tied together and are represented by the fifty bars 361 shown in FIGURE 6B.

Rows 84 and 86 are designated as the units common rows and are all tied together and are represented by the solid bar 362 shown in FIGURE 6B. Row 87 is designated as the tens digit row for the tens digits of from 5 to 9. The contacts in row 87 are connected together in groups of 10 starting from the top contact. These 5 groups of 10 contacts each are represented by the bars 363 and are numbered from 5 to 9 as shown.

Row 88 is designated as the tens common row. The contacts are all interconnected and are represented by the bar 364. Row 89 is designated as the tens digit row for the tens digits of from 0 to 4. The contacts in this row are connected together in the same manner as the contacts in row 87 and are designated by the bars 366 which are numbered from 0 to 4 as shown.

From the circuit diagram it will be noted that the bars 361 are connected by suitable wiring to the corresponding numbered terminals of the page number selector switch 131. The wiping contact of switch 371 is connected to conductor 346.

Conductor 348 is connected to the tens common bar 364 and conductor 347 is connected to the units common bar 362.

It will be noted that the tens digit bars 366 and 363 are connected to the same numbered bars of the bars 361 in such a manner that the zero tens digit bar is connected to the zero bars which are interconnected to the bars 361, the one tens digit bar is connected to the one bars of the bars 361, etc.

The network connecting the selector switch 131 to the units digits bars 361 is connected to conductors 380 to 389, conductor 380 being connected to the conductor which is common to the 0 bars of the bars 361, conductor 381 being connected to the conductor which is common to the number 1 bars and so forth. Conductors 306 through 315 from switch QS are connected to conductors 380 through 389, respectively.

As hereinbefore explained, conductors 380 to 389 are also connected to a diode matrix 390. Conductors 191, 192, 193 and 194 are connected to conductors 391, 392, 394 and 396, respectively, which are connected to one side of each of the diodes forming a part of the matrix 390. As can be seen from FIGURE 6B, conductor 380 is connected to diodes 401, 402 and 403. Conductor 381 is connected to diodes 404, 405, 406 and 407, conductor 382 is connected to diodes 408, 409 and 410, conductor 383 is connected to diode 411, conductor 384 is connected to diodes 412 and 413, conductor 385 is connected to diode 414, conductor 386 is connected to diodes 415, 416 and 417, conductor 387 is connected to diodes 418, 419, and 420, conductor 338 is connected to diodes 421 and 422, conductor 389 is connected to diodes 423 and 424. Conductor 321 is connected to diodes 425, 426, 427 and 428, conductor 287 is connected to diode 429, conductor 288 is connected to diode 430 and conductor 286 is connected to diodes 431 and 432. The diodes can be of any suitable type such as the IN91.

Operation of our store ordering machine in conjunction with our store ordering system may now be briefly described as follows: Let it be assumed that the store manager or the store ordering clerk wishes to prepare the daily grocery and perishable commodity orders for the store in which the store ordering machine is located. Let it also be assumed that the neon start lamp 142 is glowing on the store ordering machine and that at least one order guide page 94 has been positioned below the sliding arm 52 on the sliding table 39 as hereinbefore described. The power switch 152 on the tape punch 19 is closed and unpunched tape is inserted in the tape punch 19 which closes the tape punch contacts 167.

The first eleven selector switches on the control panel 16 are then set. The month of the year is set up on switches 117 and 118 which, as shown, have been set up for the ninth month. The day of the month is set up on switches 119 and 121 which, as shown, have been set up for the 24th day. The store number is set up on switches 122, 123, 124 and 126. If the store number is less than a 4 digit number, the store number is preceded by 0's set up on the selector switches not required. Thus, if the store number is 113, the store number is set up as 0113 as shown in FIGURE 3.

The price group is set up on switch 127. The warehouse number is set up on switches 128 and 129. As shown in FIGURE 3, warehouse number 03 has been selected. The page number of the selected order guide page from which the commodities are to be ordered is set up on switch 131.

The sliding table 39 is then moved to the right or the left to select the proper column on the selected order guide page. As hereinbefore described, the selected column is denoted by which of the column indicating arrows 66 or 67 is lit. The sliding arm 69 is then moved up or down the order guide page 94 until the desired commodity appears directly above the arm. The setting of switch 131 and the selection of the order guide page and the first commodity on the order guide page can be delayed until after the heading has been punched on the tape as hereinafter described.

After the first eleven selector switches on the control panel 116 have been set, the heading push button 132 may be depressed and released which causes all of the information on the selector switches except the page number selector switch to be punched on 5 channel tape by the tape punch 19 as hereinafter described.

Closing of the heading push button 132 energizes the step coil 292 for step switch HS. This circuit is completed from rectifiers 162 and 163, which produce a positive D.C. voltage which in this case is 48 volts D.C. through conductor 166, conductor 198, conductor 203, conductor 249, through the heading push button 132, conductor 339, conductor 247, through contacts 3 and 4 of switch LS, contacts 3 and 4 being closed since the switch LS is in a home position, through conductor 246 to step coil 292 to ground and the negative side of the rectifiers 162 and 163.

Nothing occurs at the time the step coil 292 is energized because switch HS is of the type which is stepped when the step coil is deenergized. As soon as the step coil 292 is deenergized upon release of heading push button 132, step switch HS is advanced to the first terminal 0 from its home position. Advancement of the stepping switch HS to the first or zero terminal causes a figures character to be punched in the tape by tape punch 19. The circuit is completed from the positive voltage on conductor 203 through conductor 249, conductor 318, conductor 319, the wiping arm of switch HS, terminal 0 of switch HS, conductor 320, through the portion of the diode matrix 390 consisting of diodes 425, 426, 427 and 428 which cause energization of punch magnets LP1, LP2, LP4, and LP5.

The circuits for the punch magnets are identical and only one circuit will be traced. For example, the circuit for energization of punch magnet LP1 is completed from the diode 425 through conductor 391 to conductor 191 through the punch magnet LP1, conductor 187, through normally closed contacts 1 and 2 of relay R2, normally closed contacts 3 and 4 of relay AR to ground.

The diode matrix 390 is a decimal to five channel Teletype converter well known to those skilled in the art. Thus, whenever a positive voltage is applied to diodes 425, 426, 427 and 428, simultaneously a figures character is punched on the tape in a manner well known to those skilled in the art.

The diodes 181, 182, 183, 184 and 186 associated with the punch magnets LP1 through LP5 serve to prevent feedback and thus serve to prevent energization of those punch magnets which are not intended to be energized.

As soon as the switch HS is moved from its home position, its contacts 3 and 4 are closed to provide a D.C. path around the heading push button 132 through contacts 177 associated with the 180° cam. At the time pulses are received by the punch magnets, the solenoid 171 is energized to withdraw the clutch lever 13 to permit rotation of the shaft 211. The solenoid 171 is energized by the same pulses which actuate the punch magnets and the current flows through one or more of the diodes 181, 182, 183, 184 and 186 depending upon which punch magnets are energized. The circuit for the solenoid is completed from the diodes through which the current flows through conductor 175, solenoid 171, conductor 173 and to ground over 187 in the same manner as the pulses passing through the punch magnets pass to ground.

As soon as the clutch lever 213 is lifted to release the clutch 212, the shaft 211 is rotated by the motor 151. The 180° cam 214 is so mounted on the shaft 211 that its contacts 1 and 2 are closed after approximately 20° of rotation of the shaft 211 from its home position. Closing of the contacts 1 and 2 for the 180° cam energizes the step coil 292 for step switch HS. This circuit is completed from the positive D.C. voltage on conductor 166 through conductor 198, contacts 1 and 2 of the 180° cam, conductor 201, contacts 3 and 4 of switch HS, conductor 247, contacts 3 and 4 of step switch HS, conductor 246, step coil 292 to ground. However, as hereinbefore explained, nothing occurs upon energization of the step coil 292.

Continued rotation of the shaft 211 causes the cams 217 to move the punches 218 which have been raised by the associated punch magnets to perforate the tape in the tape punch.

As the rotation continues, contacts 177 associated with the 285° cam 216 are closed which energize an anti-repeat circuit which prevents the tape punch from making more than one set of perforations for each set of pulses received. Specifically, the closing of contacts 177 energize relay AR opening its contacts 3 and 4 which de-energize the circuits for the punch magnet and the clutch solenoid 171. The circuit for energizing relay AR is completed from the positive voltage which appears on conductor 175 through the winding of relay AR, resistor 176, conductor 178, contacts 177 of the 285° contacts to ground.

As described previously, as soon as relay AR is energized, contacts 3 and 4 of relay AR are opened de-energizing the solenoid 171 which permits the clutch member 213 to drop into position before the clutch 212 has had an opportunity to make a complete revolution and to stop the clutch when it has made one revolution. Thus, relay AR prevents the shaft 211 from rotating more than one revolution for each set of pulses received by the punch magnets. Condenser 270 placed across the winding of the relay AR provides a time delay and insures that the relay AR will be energized for a sufficient interval of time to cause de-energization of the clutch solenoid 171.

During each revolution of the shaft 211, the contacts 197 of the 180° cam are opened which cause de-energization of the stepping coil 292 for step switch HS to advance step switch HS to the next terminal.

Since terminals 0 to 9 of step switch HS are connected to the figures diode configuration consisting of diodes 425, 426, 427 and 428, the figures character will be punched in the tape by the tape punch 19 for each step the switch is advanced until terminal 10 is reached. Upon each step, the same sequence of steps will take place as hereinbefore described—the shaft 211 making only one revolution for each step the switch HS is advanced. Thus, figures characters will be punched ten times into the tape. This is done to give a leader on the tape which facilitates feeding the tape into the tape transmitter 21, as hereinafter described.

When the stepping switch HS is advanced to the next terminal which is terminal 10, the wiping arm of stepping switch HS is connected to conductor 321 which is connected to conductor 287. Conductor 287 is connected to the diode 429 which is the diode configuration for a Carriage Return character on a conventional Teletype system. The Carriage Return character will be punched on the tape produced by the tape punch 19 in a manner very similar to that hereinbefore described for the punching of figures characters on the tape except that the circuit will be completed through diode 429.

After the Carriage Return character has been punched on the tape, the stepping switch HS will be advanced to the next terminal which is terminal 11 which is connected to conductor 322. Conductor 322 is connected to conductor 288 and conductor 288 is connected to the diode 430 which is the diode configuration for producing a Line Feed character in a conventional Teletype system. Thus, when the wiper arm is advanced to terminal 11, a Line Feed character is punched on the tape in a manner similar to that hereinbefore described for the Carriage Return and the figures characters.

After the Line Feed character has been punched on the tape by the tape punch 19, the stepping switch HS is advanced to the next terminal which is terminal 12. Terminal 12 is connected to conductor 323 and as hereinbefore described, conductor 323 is connected to the wiper of the first selector switch 117. As also hereinbefore described, the terminals 0 to 9 of each of the first eleven selector switches are interconnected and are connected to the proper terminal of the diode matrix 390 in the same manner as is the twelfth selector switch 131.

Thus, when the step switch HS is advanced to terminal 12, a 0 digit will be punched on the tape because the selector switch 117 has been set on 0. The circuit to the punch magnet will be completed through the diodes connected to conductor 380 in a manner similar to that hereinbefore described. After the 0 digit has been punched on the tape, the step switch HS is advanced to the next terminal which is terminal 13 which is connected to conductor 324. Conductor 324, as hereinbefore described, is connected to the wiper of the selector switch 118. Since the selector switch 118 is set on the digit 9, the digit 9 will be punched on the tape.

The stepping switch HS is advanced to the next terminal and this procedure continues until the stepping switch HS has been advanced to terminal 23. By this time the settings on the first eleven selector switches 117, 118, 119, 121, 122, 123, 124, 126, 127, 128 and 129 will have been punched on the tape. Thus, the information relating to the months of the year, day of the month, the store number, the price group and the warehouse number will have been punched on the tape.

When the wiping arm of the stepping switch HS is advanced to terminal 23, a Carriage Return will be punched on the tape because terminal 3 is connected to conductor 321 by conductor 334. As described previously, conductor 321 is connected to the terminal of the diode matrix which causes a Carriage Return to be punched on the tape. The stepping switch HS is next advanced to terminal 4 which causes a Line Feed to be punched on the tape.

The stepping switch HS is then advanced to terminal 25 and rapidly returns to its home position. The homing circuit is completed from the positive voltage on conductor 166 through conductor 198, conductor 203, conductor 249, conductor 318, conductor 319, the wiper arm of stepping switch HS, terminal 25, conductor 337, interrupting contacts 1 and 2 of switch HS, conductor 338, conductor 247, normally closed contacts 3 and 4 of step switch LS, conductor 246, the winding of step coil 292 to ground.

Energization of the homing circuit causes energization of the step coil 292 and opens interrupting contacts 1 and 2. Opening of interrupting contacts 1 and 2 de-energizes step coil 292 to advance the stepping switch HS to the next terminal which again causes energization of the step coil 292 and so forth to return the step switch to its home position.

This completes what may be termed the heading operation which causes the store ordering machine to automatically punch the heading on the tape upon operation of the heading push button 132.

After this heading operation has been completed, the twelfth selector switch or selector switch 131 is set for the page number which appears on the order guide page 94 resting on the sliding table 39 and from which the operator intends to order commodities. The sliding table 39 is shifted to the desired position so that the proper column indicating arrow 66 or 67 is lit. The sliding arm 52 is moved to a position so that the upper edge of the arm 69 immediately underlines the commodity to be ordered.

After the sliding arm 52 has been properly positioned and switch 131 set, the commodity push button 134 is pressed and released. Closing of the commodity push button 134 energizes the step coil 351 for relay CS. This circuit is completed from the positive voltage which is on the conductor 249 as hereinbefore described through the commodity push button 134, conductor 281, conductor 352, the winding of step coil 351 to ground. Upon release of the commodity push button 134, the step coil 351 is deenergized and the wiping contacts of the stepping switch CS are advanced to the 0 terminals of banks numbered 1 and 2 of the stepping switch.

Terminal 0 of bank 1 of switch CS is connected to conductor 343 which is connected to conductor 287. As hereinbefore explained, conductor 287 is connected to the Carriage Return terminal of the diode matrix 390. Thus, as soon as the wiping contact of the stepping switch is advanced to the 0 terminal a Carriage Return is punched on the tape in a manner similar to that hereinbefore described. The voltage is applied to the conductor 287 from conductor 249 through conductor 318, the wiping contact of switch CS to terminal 0 of bank number 1 of switch CS, conductor 343 to conductor 287 and so forth, as hereinbefore described.

During the punching of the Carriage Return on the tape, contacts 1 and 2 of the 180° cam 214 are closed to cause energization of the step coil 351. This circuit is completed from the positive D.C. voltage on conductor 166 through conductor 198, contacts 1 and 2 of the contacts 177 associated with the 180° cam, conductor 201, conductor 247, conductor 290, contacts 3 and 4 of step switch CS (closed when the step switch CS moves from its home position), conductor 281, conductor 352, step coil 351 to ground.

As soon as the 180° cam contacts 177 are opened, step coil 351 is deenergized causing the step switch CS to be advanced to the next terminal which in this case is terminal 1.

Terminal 1 of bank 1 of switch CS is connected to conductor 344 which is connected to conductor 322. As hereinbefore explained, conductor 322 is connected to the Line Feed terminal of the diode matrix 390. Thus, upon advancement of the switch CS to terminal 1, a Line Feed is automatically punched on the tape.

After causing punching of the Line Feed, the step switch CS is advanced to terminal 2. Terminal 2 of bank 1 of switch CS is connected to conductor 346 and conductor 346 is connected to the wiping arm of the page number selecting switch 131. The wiping arm of the selector switch 131 has been positioned on terminal 7. Terminal 7 is connected to conductor 387 which is connected to the seven digit of the diode matrix 390. The number 7 is, therefore punched into the tape at this time by the tape punch 19 through a circuit similar to that hereinbefore described and serves to indicate the number of the selected order guide page 94 being used on the sliding table.

At the same time a positive voltage is applied to terminal 2 of bank 1 of switch CS, a positive pulse or voltage is applied to terminal 2 of bank 2 of switch CS which causes the stepping switch LS to be advanced from its home position to terminal 1.

The circuit for energizing the step coil 239 of switch LS is completed from the positive voltage on conductor 166 through conductor 198, conductor 203, conductor 249, conductor 318, the wiper for bank 2 of step switch CS, terminal 2 of bank 2 of switch CS, conductor 289, conductor 248, through the winding of the step coil 239 to ground.

The step switch LS, however, is not advanced to terminal 1 until the step coil 239 is deenergized by stepping of the stepping switch CS from terminal 2 to terminal 3 when the 180° cam closes its contacts 1 and 2 to advance the step switch CS.

Upon advancement of the step switch CS to terminal 3, the tens digit of the commodity code of the selected commodity is punched on the tape. For example, if the sliding table 39 and the sliding arm 52 are in the position shown in FIGURE 3, the sliding arm will be immediately beneath the commodity which has been assigned code number 12 in column 104. The contact arms 73 and 74 will be positioned as shown in dotted lines in FIGURE 6B.

With the contact arm 74 positioned as shown, the number 1 will be punched on the tape for the tens digit when the step switch CS is advanced to terminal 3. The circuit is completed from the positive voltage on conductor 166 through conductor 198, conductor 203, conductor 249, conductor 318, the wiping contact of bank 1 of switch CS, terminal 3 of switch CS, conductor 348, the tens common bar 364, the contact arm 74, the number 1 bar of the tens digit bars 366 to conductor 381 and to the number 1 digit terminal of the diode matrix 390 to operate the punch magnets connected to diodes 404, 405, 406 and 407 in a manner as hereinbefore described.

During punching of the number 1 digit, the contacts 177 associated with the 180° cam are closed to advance the step switch CS to the next terminal which in this case is terminal 4. This causes the units digits of the commodity code of the selected commodity to be punched on the tape. The circuit is completed from the positive voltage on conductor 166 to the wiper arm of switch CS in a manner hereinbefore described to terminal 4 of bank 1 of switch CS, conductor 347 to the units common bar 362, contact arm 73 to the number 2 bar of the second group of unit digits bars 361 to conductor 382 to the number 2 digit terminal of the diode matrix 390 and through circuitry similar to that hereinbefore described to operate the proper punch magnets to punch the digit 2 in the tape.

Step switch CS is next advanced to terminal 5 and then rapidly steps to its home position. The circuit for completing this stepping operation is completed from the positive voltage on the wiping contact of bank 1 of step switch CS to terminal 5 of bank 1 to conductor 349, interrupting contacts 1 and 2 of switch CS, to the winding of the step coil 351 to ground. As soon as the step coil 351 is energized, interrupting contacts 1 and 2 are opened to deenergize the step coil to advance the step switch to the next terminal and to cause re-energization of the step coil 351. This continues until the step switch CS has returned to its home position. This completes the punching of the commodity code of the selected commodity on the tape.

The quantity of the selected commodity is now punched on the tape. Let it be assumed that it is desired to order 50 units of the conventional pack of the selected commodity. The proper tens digits number is selected on the dial 146 of the device 143 and the dial is rotated in a clockwise direction as viewed in FIGURE 6C until the stop 147 is engaged. When the dial 146 is first moved, arcuate contact 254 disengages contact 256 and engages contact 253. This causes energization of the step coil 302 for minor switch QS. The circuit is completed from the positive voltage on the conductor 166 through conductor 198, conductor 203, contact 202, contact 254, contact 253, contacts 252, conductor 251, the winding of step coil 302 to ground.

Switch QS is of the type which is advanced upon energization of its step coil and for that reason when the step coil 302 is first energized, the wiping contact of switch QS is advanced to the 0 terminal.

When the dial 146 for the dial switch 143 is released, the pulsing contacts 252 are opened and closed one time for each number passed in a manner well known to those skilled in the art. Each opening and closing of the pulsing contacts 252 causes energization of the step coil 302 to advance the switch QS to the next terminal in a manner very similar to the manner in which the stepping coil 302 was first energized. Since the tens digit 5 was selected on the dial, the stepping switch QS is advanced to the number 5 terminal.

As soon as the dial of the dialing device 143 has returned to its home position, the number selected on the stepping switch QS will be punched on the tape by the tape punch 19. The circuit is completed from the positive voltage on conductor 203 through contact 202, contact member 254, contact 256, conductor 257, the wiping arm of switch QS, terminal 5 of switch QS, conductor 311 to conductor 385 to terminal 5 of the diode matrix 390, to the diode 414 to actuate the proper punch magnet in a manner similar to that hereinbefore described.

During punching of the digit five contacts 1 and 2 of the 180° cam are closed to return step switch QS to its home position. Step switch QS is returned to its home position in a manner well known to those skilled in the art by energization of the coil 296 which withdraws a catch as shown diagrammatically to permit the wiper to return to its home position. The circuit for energizing the solenoid 296 is completed from the positive voltage on conductor 166 through conductor 198, contacts 1 and 2 of the 180° cam, conductor 201, conductor 247, conductor 294 to closed contacts 1 and 2 of relay R3, conductor 297 through the winding of the solenoid or coil 296 to ground.

Contacts 1 and 2 of relay R3 are closed at the time the step switch QS is moved from its home position. The circuit for energizing relay R3 is completed from the positive voltage on conductor 249 to conductor 316 contacts 1 and 2 of switch QS (closed when switch QS moves from its home position), conductor 317 through the winding of relay R3 to ground.

Energization of relay R3 also closes the contacts 3 and 4 which energize the anti-repeat circuit during the dialing operation. Closing of these contacts 3 and 4 prepares a circuit for energizing relay R2 when contacts 177 associated with the 285° cam are closed. The circuit for energizing relay R2 is completed from the positive voltage, which appears on conductor 175 upon punching the tens digit five through conductor 277, contacts 3 and 4 of relay R3, conductor 276, conductor 269, the winding of relay R2, resistor 266, conductor 267, conductor 178, contacts 177, to ground. As soon as relay R2 is energized its contacts 1 and 2 are opened de-energizing the solenoid 171 to release the clutch member 213 as hereinbefore described.

Relay R2 is de-energized as soon as contacts 177 are opened by the 285° cam. However, the time delay condenser 268 insures that the relay R2 is energized for a period of time to permit de-energization of the solenoid 171.

The apparatus is now in condition for dialing of the second or units digits number which in this case is 0. After the dial 146 is rotated in a clockwise direction from the zero position to the stop 147 and when the dial 146 returns to its home position, the step switch QS is advanced from its home position to the 0 position in a manner similar to that hereinbefore described. When step switch QS is advanced from its home position its normally open contacts 1 and 2 are closed to energize relay R3.

When the dial 146 is released and returns to its home position from the zero selection the pulsing contacts 252 are not operated because of the limited travel of the dial and therefore the wiping contacts of switch QS remains in the 0 position.

At the moment the dial returns to its home position, a circuit is completed through the dial contact member 254 in a manner similar to that hereinbefore described, through conductor 257, the wiping contact of switch QS, the 0 terminal of switch QS, conductor 306, to conductor 380 and to 0 digit terminal of the diode matrix 390 to operate the proper punch magnets in a manner similar to that hereinbefore described.

Upon closing of the contacts 1 and 2 of the 180° cam, the solenoid 296 is again energized and returns the switch QS to its home position. Upon closing of the contacts 177 of the 285° cam relay R2 is energized to de-energize the solenoid 171 as hereinbefore described. This completes dialing of the quantity of the commodity.

If it is desired to dial more than 100 of a selected commodity, a series of 99's are dialed first and then the difference is dialed. For example, if 200 units of a certain commodity are desired, the numbers 99 are first dialed, then another 99, and then a 02.

This completes the punching of the tape for the first commodity selected. The sliding table and the sliding arm are both placed in the proper position to select the second commodity desired. The commodity push button 134 is pressed and released to start a sequence of operations similar to that hereinbefore described to punch the page number and the commodity code of the selected commodity. The desired quantity is then dialed with the dialing device 143.

It should be pointed out that the start lamp 142 will go out when the stepping switch LS moves from its home position. This is because the energizing circuit for the start lamp 142 is interrupted by movement of the wiper on the switch LS from its home position. As is apparent from the circuit diagram, the circuit for the start lamp 142 is normally completed from the 110 volt supply through conductor 208, the wiper of switch LS through the home terminal of switch LS, conductor 222, lamp 142, conductor 224, resistor 223, conductor 206 to the other side of the 110 volt supply.

When a new order guide page is required, the sliding arm 69 is lifted and the desired page is turned up. It must be remembered that each time the order guide page is changed, the new page number must be set up on the twelfth selector switch 131. In the case of orders where the page is changed from the range of 09 to 10 or from 10 to 19 to 20 to 29, and etc., it is also necessary to reset the eleventh selector switch 129. The numbers have been assigned to the warehouses and the pages so that the last digit of the warehouse number is the ends digit of the page number. When the setting of the eleventh selector switch 129 is changed, it is necessary to start a new Teletype page by positioning to start and entering a new heading.

It will be noted that each time a commodity code is punched on the tape, the stepping switch LS is advanced one terminal. This continues until the 28th commodity code has been punched on the tape. The entry of the 28th commodity code completes a Teletype page as hereinafter described.

When the stepping switch LS is advanced to terminal 28, the bell 231 is energized and the lamp 141 is lit which signifies that the last line has been reached. The circuit for energizing the lamp 141 and the bell 231 is completed from the 110 volt supply through conductor 208, the wiping contact of switch LS, terminal 28, conductor 229, lamp 141, through voltage dropping resistor 227, conductor 228, conductor 206 to the other side of the 110 volt supply. The bell 231 is connected in parallel with the lamp 141 and series resistor and is energized at the same time.

When the bell 231 starts ringing and the lamp 141 is lit, the carriage return button 134 is first depressed and released and then the line feed button 136 is depressed and released. Closing of the carriage return push button 133 causes a positive pulse to be applied to the carriage return terminal of the diode matrix 390 to cause a Carriage Return character to be punched on the tape in a manner similar to that hereinbefore described.

Pressing of the line feed push button 136 causes a positive pulse to be applied to the line feed terminal of the diode matrix 390 in a manner similar to that hereinbefore described. The circuit is completed through the upper contacts of the line feed push button 136.

Closing of the bottom contacts of the line feed push button 136 causes energization of the step coil 239 of the step switch LS. This circuit is completed from the positive voltage on conductor 249 through the lower terminals of the push button 136, conductor 289, conductor 248, to the winding of the step coil 239 to ground.

As soon as the line feed push button is released, the step coil 239 is de-energized causing the step switch LS to be moved to the next terminal which is terminal 29. This causes lighting of the line feed lamp (LF) 38 which indicates that the line feed push button should be depressed again. The line feed push button is then depressed a second time which causes a Line Feed character to be punched onto the tape. The stepping switch is again advanced to the next terminal which is terminal 30. This causes energization of the line feed lamp (LF) 39 and indicates that the line feed push button should be depressed a third time. Depressing the line feed button the third time causes another line feed to be punched onto the tape and movement of the step switch LS to terminal 31 to cause energization of relay R1.

Energization of relay R1 causes homing of step switch LS. This circuit is completed from the positive voltage on conductor 203 through closed contacts 1 and 2 of relay R1, conductor 236, contacts 1 and 2 of step switch LS (open at home but closed since step switch LS is not in its home position), conductor 238, interrupting contacts 1 and 2 of step switch LS, the winding of step coil 239 to ground.

Energization of the stepping coil 239 causes its interrupting contacts 1 and 2 to be opened. Opening of the interrupting contacts de-energizes the coil 239 and causes stepping switch LS to be advanced to the next terminal to again re-energize the step coil 239. This sequence of steps continues until the stepping switch LS has stepped to its home position. When the step switch LS has been returned to its home position, the start lamp 142 will glow which indicates that the store ordering machine is ready to start a new Teletype page.

The hereinbefore described series of Line Feeds serves to bring the next Teletype page into position in the page printer as hereinafter described. The heading is then automatically entered on the new page by operating the heading push button 132. The same sequence of steps is then taken in ordering commodities as hereinbefore described.

If a commodity is ordered from a different warehouse, a new Teletype page must be started. To bring a new Teletype page into position the line feed push button is actuated until the stepping switch LS is advanced to terminal 28 and then the same sequence of steps is performed as hereinbefore described.

If an error is made in ordering a commodity, the push button 137 is depressed which causes a positive pulse to be applied to the error terminal of the diode matrix 390 which causes an error character to be punched on the tape.

After the order has been completed by use of the store ordering machine, the tape produced by the tape punch 19 is fed out of the tape punch 19 by closing the tape feed switch 169. As is readily apparent from the circuit diagram, closing of switch 169 energizes the clutch solenoid 171 to permit the tape to be advanced through the tape punch 19.

After sufficient tape has been advanced, switch 169 is opened and the tape is torn off and inserted into the tape transmitter 21.

The tape transmitter 21 as is well known to those skilled in the art, generates a plurality of pulses in the form of marks and spaces which are sent over the electrical circuit 13 to the typing reperforator 23 at the communications center. At the same time a page copy is produced at the store by the page printer 22.

The typing reperforator at the communications center produces a tape similar to that inserted in the tape transmitter 21 except that it is chadless and inerpreted as is well known to those skilled in the art. The five channel tapes produced by all of the typing reperforators at the communications center are torn into separate sections so that each section contains only orders for a single warehouse. All of the tapes for one warehouse are fed through the automatic transmitter 24 connected to the warehouse for which the orders on the tapes are intended.

Figure 7:
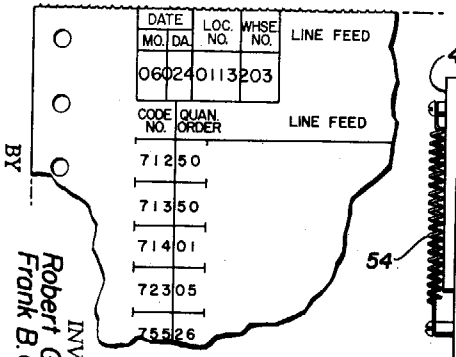
FIGURE 7 shows a portion of a typed order.

The automatic transmitter sends a plurality of pulses in the form of marks and spaces to the selected warehouse where the marks and spaces are received by the page printer 26 to produce multiple copies of the order. An example of the type of order which is produced by the page printer 26 is shown in FIGURE 7. From this figure it can be seen that the month of the year, the day of the month, the store number, the price group and the warehouse number are printed on one line. The first two numbers of the heading designate the month of the year, the second two numbers designate the day of the month, the second four numbers designate the store number, the next number designates the price group and the last two numbers designate the warehouse number.

The page printer then receives a carriage return and two line feeds to put it in position to receive the first typing line. On each line is printed the page number from which the commodity is selected, the code number of the selected commodity and the quantity ordered. As for example, as shown in FIGURE 7, the first number designates the page number selected, the second two numbers designate the code number of the commodity selected and the last two numbers designate the quantity ordered.

As many copies as desired can be produced by the page printer 26. For example, a three copy form can be utilized in which one copy goes to the store with the order when the order is shipped, one copy goes to the accounting or billing department and one copy stays in the warehouse which ships the order.

At the same time that the order is being transmitted to the warehouse, the order is received on a typing reperforator 27 in the billing center. One reperforator is required for each warehouse. The typing reperforator produces an interrupted five channel punched tape as is well known to those skilled in the art. After the order has been completed, the tape is removed from the typing reperforator and fed into the tape-to-card converter 28 which makes up IBM cards for billing, inventory records and accounting uses.

It is apparent from the foregoing that we have provided a novel store ordering system and apparatus which greatly facilitates the ordering of commodies by the stores and shipment of the commodities to the stores. The system and apparatus is particularly advantageous in connection with the ordering and delivery of perishable food. The system will enable buyers for all of the stores to expedite movement of a vast quantity of perishables which daily move through each of the stores. When additional perishables or commodities are required, the store manager need merely prepare the order on the store ordering machine, place the tape in the transmitter and shortly thereafter his order will be on the way. The foods obtained by the store in this manner are much fresher because they are only hours off of the refrigerated warehouse floors. If there are sudden changes in the weather which will increase the demand, the orders can be revised upwardly with very little trouble.

By utilizing such a system, the store managers can place their orders each day within a few minutes which makes possible a tremendous saving of time.

The system used for ordering perishables and other commodities, by addition of very little conventional Teletype equipment can be used for transmitting plans, letters, forms and the like to the individual stores. The system can also be utilized for transmitting to the stores all price guide pages and price adjustment forms.

We claim:

1. In a store ordering apparatus of the type adapted to indicate a commodity ordered by generated pulses, the store ordering apparatus comprising order guide means having listed thereon a plurality of commodities in a predetermined arrangement, an arm [movable], *means for mounting said arm to permit movement of said arm* over said order guide means [and adapted to be positioned] to select one of the commodies listed on said order guide means, fixed contact means arranged in a predetermined manner in accordance with the positioning of the commodities listed on the order guide means, movable contact means carried by the arm and adapted to engage said fixed contact means and circuit means including starting means connected to said fixed contacts for automatically generating pulses identifying the commodity selected by the movable arm after operation of said starting means.

2. A store ordering apparatus as in claim 1 wherein said commodities are listed on said order guide means in at least two rows and wherein said arm may be positioned to select a commodity listed in any row.

3. A store ordering apparatus as in claim 1 together with means for generating pulses identifying the store placing the order.

4. In a store ordering apparatus of the type adapted to indicate a commodity ordered by generated pulses, the store ordering apparatus comprising an order guide page having listed thereon a plurality of commodities in a predetermined arrangement, means for carrying said order guide page in a predetermined position, an arm, *means for mounting said arm to permit movement of said arm* [movable] over said page [and adapted to be positioned] to select one of the commodities listed on said page, contact means fixed relative to the order guide page and arranged in a predetermined manner in accordance with the positioning of the commodities listed on the order guide page, movable contact means carried by said arm and adapted to engage the fixed contact means, and circuit means including starting means connected to the fixed contacts, said circuit means upon operation of said starting means automatically generating a series of pulses identifying the commodity selected by the arm.

5. Apparatus as in claim 4 together with means connected to said circuit means for generating pulses determining the quantity of the selected commodity desired.

6. A store ordering apparatus as in claim 5 together with additional circuit means including starting means for automatically generating a series of pulses identifying the store placing the order, and the date of placement of the order upon operation of the starting means connected to said additioal circuit means.

7. In a store ordering apparatus of the type adapted to indicate information upon a punched teletypwriter tape, the store ordering apparatus comprising an order guide page having listted thereon a plurality of commodities in a predetermined arrangement, each of the commodities having a code number of the decimal system assigned thereto, frame means for detachably carrying said order guide page in a predetermined position, an arm mounted on said frame means and movable over said order guide page and adapted to be positioned to select one of the commodities listed on said order guide pages, fixed contact means carried by said frame means and arranged in a predetermined manner in accordance with the positioning of the commodities listed on the order guide page, movable contact means carried by the arm and adapted to engage said fixed contact means, punch operating means adapted to punch said tape, decimal to teletypewriter code converting means connected to said punch operating means, and circuit means including starting means connected to said fixed contacts and to said converting means whereby upon operation of said starting means, the code number of the commodity selected will be automatically punched onto said tape.

8. Store ordering apparatus as in claim 7 together with means including a dialing device connected to said circuit means whereby upon operation of said dialing device the desired quantity of the selected commodity is automatically punched onto the tape.

9. Store ordering apparatus as in claim 7 together with means including starting means and a plurality of selector switches having wipers connected to said circuit means whereby upon operation of said last named starting means the wiper positions of said selector switches will be automatically punched on said tape.

10. In a store ordering apparatus of the type adapted to indicate information upon a punched teletypewriter tape, the store ordering apparatus comprising an order guide page having listed thereon a plurality of commodities in a predetermined arrangement in two or more rows, each of the commodities listed thereon having a code number of the decimal system assigned thereto, a sliding table for carrying said order guide page in a predetermined position, a framework serving to mount said sliding table, an arm mounted on said sliding table and movable over said order guide page and adapted to be positioned to select one of the commodities listed on said order guide page, fixed contact means carried by said framework and arranged in a predetermined manner in accordance with the positioning of the commodities listed on the order guide page, movable contact means carried by the arm and adapted to engage said fixed contact means, said sliding table being adapted to be positioned to permit selection of a commodity from any of said rows by said arm, punch operating means adapted to punch tape, decimal to teletypewriter code converting means connected to said punch operating means, and circuit means including starting means connected to said fixed contacts and to said decimal to teletype converting means whereby upon operation of said starting means, the code number of the commodity selected by the arm will be punched onto said tape.

11. Store ordering apparatus as in claim 10 wherein said sliding table is movable in one direction with respect to said framework and said arm is movable in a direction with respect to said sliding table at right angles to the direction of movement of said sliding table with respect to said framework.

*12. In a store ordering apparatus of the type adapted to indicate a commodity ordered by an electrical signal, the store ordering apparatus comprising order guide means having listed thereon a plurality of commodities in a predetermined arrangement, an arm, means for mounting said arm to permit movement of said arm over said order guide means to select one of the commodities listed on said order guide means, fixed contact means arranged in a predetermined manner in accordance with the positioning of the commodities listed on the order guide means, movable contact means carried by the arm and adapted to engage said fixed contact means, and circuit means including starting means connected to one of said contact means for generating electrical signals identifying the commodity selected by the movable arm after operation of said starting means.*

*13. Store ordering apparatus as in claim 12 wherein said commodities are listed on said order guide means in at least two rows and wherein said arm is adapted to be positioned to select a commodity listed in any row.*

*14. Store ordering apparatus of the type adapted to indicate a commodity ordered by electrical signals, the store ordering apparatus comprising an order guide page having listed thereon a plurality of commodities in a predetermined arrangement, means for carrying said order guide page in a predetermined position, an arm, means for mounting said arm to permit movement of said arm over said page to select one of the commodities listed on said page, contact means fixed relative to the order guide page and arranged in a predetermined manner in accordance with the positioning of the commodities listed on the order guide page, movable contact means carried by said arm and adapted to engage the fixed contact means, and circuit means including starting means connected to one of said contact means, said circuit means upon operation of said starting means generating electrical signals identifying the commodity selected by the arm.*

*15. In apparatus of the character described, means having listed thereon a plurality of commodities in a predetermined arrangement, an arm, means for mounting said arm to permit movement of said arm to select one of the commodities listed on said means, fixed contact means*

*arranged in a predetermined manner in accordance with the positioning of the commodities listed on the first named means, movable contact means associated with the arm and adapted to engage said fixed contact means, and circuit means connected to one of said contact means, said circuit means including initiating means whereby when said initiating means is operated, said circuit means produces electrical signals representing the commodity selected by the movable arm.*

References Cited in the file of this patent or the original patent

UNITED STATES PATENTS

| | | |
|---|---|---|
| 730,858 | Armstrong | June 16, 1903 |
| 1,974,191 | Nelson et al. | Sept. 18, 1934 |
| 2,135,377 | Dirkes et al. | Nov. 1, 1938 |
| 2,264,052 | Quinby | Nov. 25, 1941 |
| 2,317,995 | Krum | May 4, 1943 |
| 2,433,362 | Hartley et al. | Dec. 30, 1947 |
| 2,472,885 | Colman | June 14, 1949 |
| 2,716,155 | Smith et al. | Aug. 23, 1955 |